(12) United States Patent
MacPherson et al.

(10) Patent No.: US 9,082,054 B2
(45) Date of Patent: Jul. 14, 2015

(54) AUTHENTICATION DEVICE FOR SECURITY DOCUMENTS

(71) Applicant: Bank of Canada, Ottawa (CA)

(72) Inventors: Charles Douglas MacPherson, Santa Barbara, CA (US); Theodoros Garanzotis, Ottawa (CA)

(73) Assignee: Bank of Canada, Ottawa, Ontario, CA (US)

( * ) Notice: Subject to any disclaimer, the term of this patent is extended or adjusted under 35 U.S.C. 154(b) by 0 days.

(21) Appl. No.: 14/345,781

(22) PCT Filed: Sep. 19, 2012

(86) PCT No.: PCT/CA2012/050648
§ 371 (c)(1),
(2) Date: Mar. 19, 2014

(87) PCT Pub. No.: WO2013/040703
PCT Pub. Date: Mar. 28, 2013

(65) Prior Publication Data
US 2014/0252098 A1 Sep. 11, 2014

Related U.S. Application Data

(60) Provisional application No. 61/536,667, filed on Sep. 20, 2011.

(51) Int. Cl.
| | |
|---|---|
| G06Q 40/00 | (2012.01) |
| G07D 11/00 | (2006.01) |
| G07F 19/00 | (2006.01) |
| G06K 19/06 | (2006.01) |
| H02N 2/18 | (2006.01) |
| B42D 25/29 | (2014.01) |

(52) U.S. Cl.
CPC .......... *G06K 19/06046* (2013.01); *B42D 25/29* (2014.10); *H02N 2/18* (2013.01); *B42D 2033/12* (2013.01); *B42D 2035/20* (2013.01)

(58) Field of Classification Search
USPC .......... 235/375, 451, 492, 494, 380, 457, 488
See application file for complete search history.

(56) References Cited

U.S. PATENT DOCUMENTS

| | | | | |
|---|---|---|---|---|
| 4,763,927 | A  | * | 8/1988 | Schneider ........................ 283/70 |
| 6,712,399 | B1 | * | 3/2004 | Drinkwater et al. .......... 283/111 |
| 6,806,930 | B2 | * | 10/2004 | Moia ............................. 349/117 |

(Continued)

FOREIGN PATENT DOCUMENTS

| | | |
|---|---|---|
| KR | 2008-0094252 A | 10/2008 |
| WO | 2008-040056 A1 | 4/2008 |

OTHER PUBLICATIONS

International Search Report mailed Dec. 12, 2012 for PCT/CA2012/050648 filed Sep. 19, 2012.

*Primary Examiner* — Tuyen K Vo
(74) *Attorney, Agent, or Firm* — Kacvinsky Daisak Bluni PLLC

(57) ABSTRACT

An optical based authentication device that is attachable to a security document having a substrate. The authentication device includes: a piezoelectric material layer for generating an electric field in response to mechanical stress; and an optically responsive layer directly attached to the piezoelectric material layer, the attached layers being absent a direct electrical connection, the optically responsive layer being operable between a first state and a second state having different ocular perceptions. The optically responsive layer changes from the first state to the second state in response the electric field generated by the piezoelectric material layer.

14 Claims, 7 Drawing Sheets

(56) References Cited

U.S. PATENT DOCUMENTS

| | | | |
|---|---|---|---|
| 8,562,025 B2* | 10/2013 | Drinkwater | 283/94 |
| 2003/0035191 A1* | 2/2003 | Moia | 359/281 |
| 2005/0161501 A1* | 7/2005 | Giering et al. | 235/379 |
| 2010/0084850 A1* | 4/2010 | Jackson et al. | 283/83 |
| 2010/0295290 A1* | 11/2010 | Muth et al. | 283/109 |
| 2011/0096388 A1* | 4/2011 | Agrawal et al. | 359/268 |
| 2012/0068450 A1* | 3/2012 | Macpherson et al. | 283/70 |

* cited by examiner

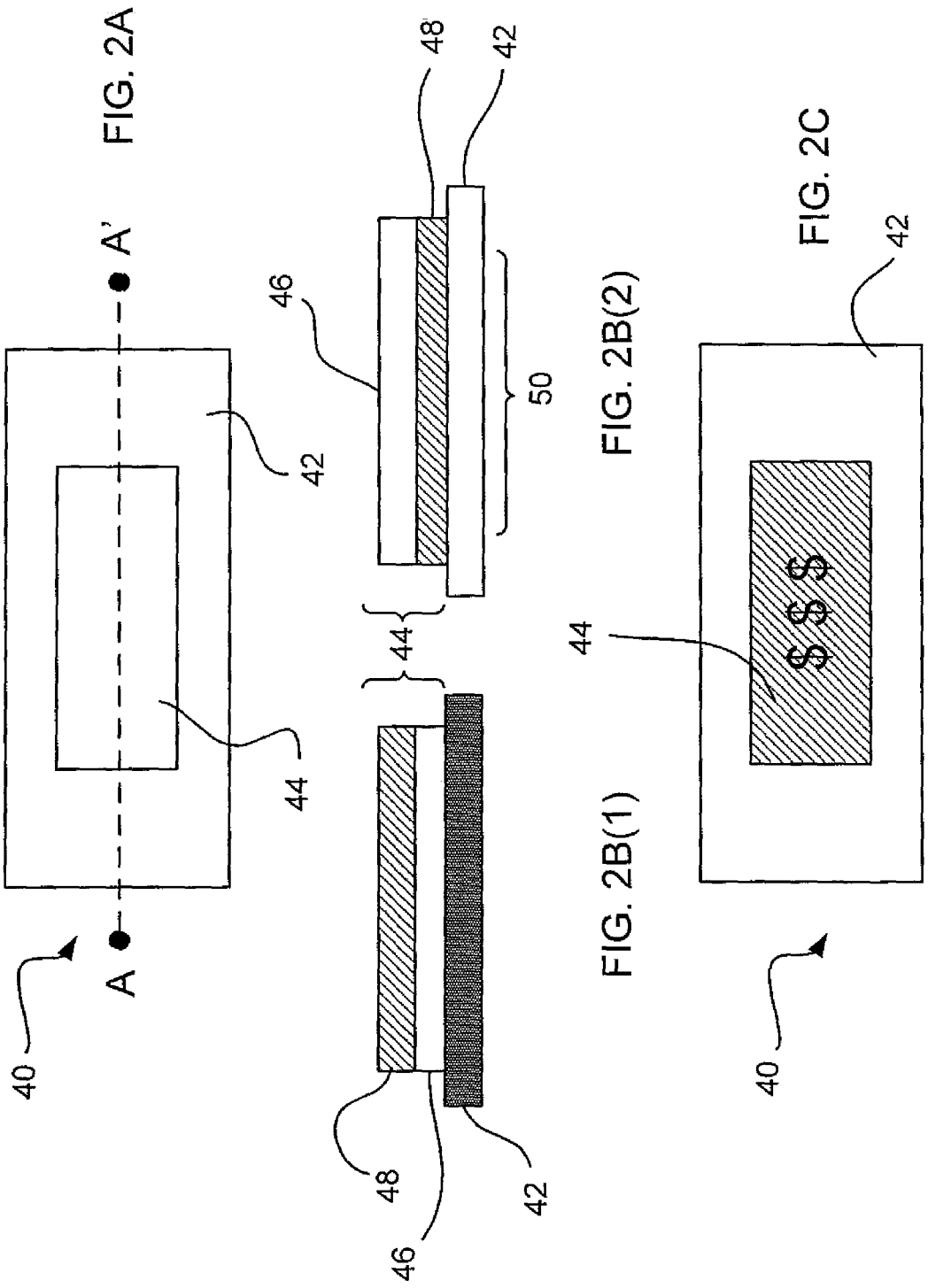

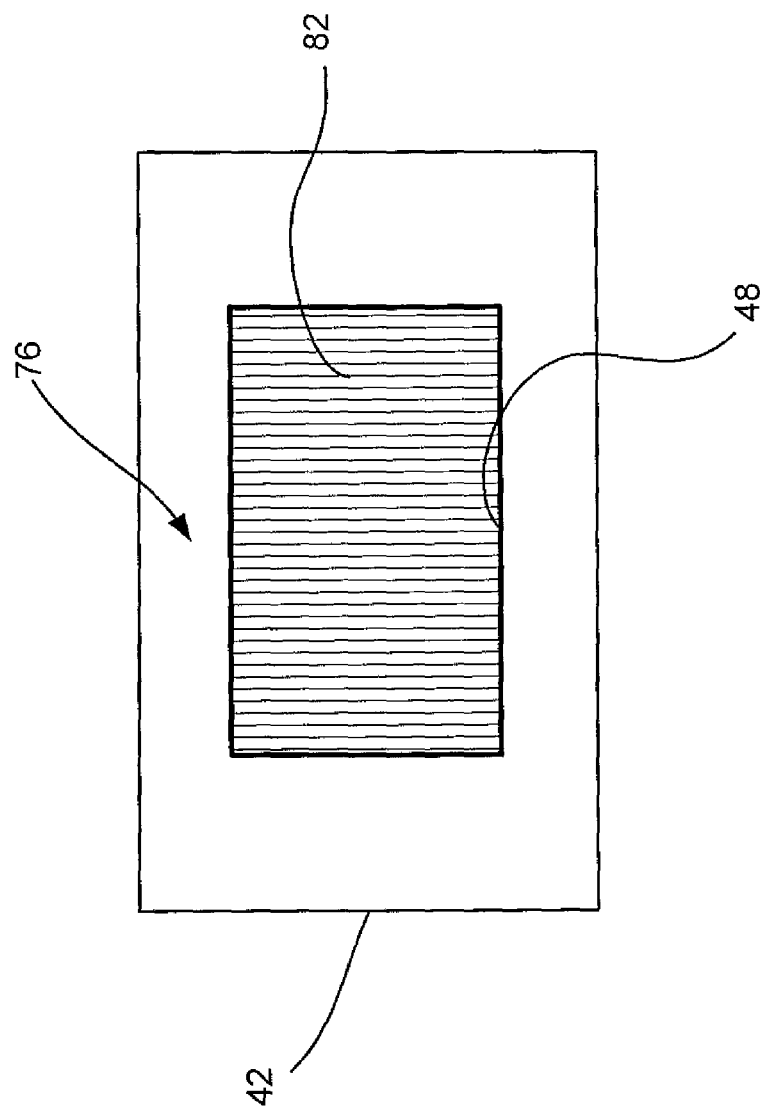

AUTHENTICATION DEVICE FOR SECURITY DOCUMENTS

FIELD OF THE DISCLOSURE

The described embodiments relate to authentication devices that can be incorporated into security documents that may be subject to counterfeiting, such as banknotes, cheques and passports.

BACKGROUND

Security documents often incorporate an authentication device that includes an optically variable feature such as diffraction gratings or holographic optical microstructures. These features can exhibit optically variable effects such as colour changes, movement effects, and distinct switches between images.

Certain optically variable features may include polymer or laminate microstructures in the form of foils that exhibit colour shifts in transmitted light passing through the foil and/or ambient light reflecting from the foil. Tilting the foil results in a visible colour-shift effect due for example to a laminate microstructure, or Bragg stacking within the foil. Such features provide useful surface security features in applications where the substrate to which they are applied is flexible or foldable, such as in banknotes.

Further known authentication devices include optical elements that include various circuits or circuit components, wherein application of a current to the circuit or circuit components causes a change in the properties of the optical elements. Such devices include an internal or external associated power source to supply electric current to the circuit and its components to cause the change in optical properties. These electrical authentication devices typically directly electrically connect a piezoelectric material (as the power source) with a state changing material (i.e., an active layer) such an electrophoretic, polymer dispersed liquid crystal. However, these traditional solutions use electrodes and electrical circuits to conduct the charge generated by the piezoelectric material to the state changing material.

Although these traditional solutions produce a change in the state (colour change, character appearance, etc.) of the active layer, such approaches suffer a significant design flaw since the authentication device's operation is vulnerable to failure should one of the electrodes, which conduct electrical charge to the active layer, be cut or broken. Further, these traditional authentication devices have not been capable of surviving the commonly known "crumpling tests" performed as part of durability testing for banknotes.

There is a continuing need to improve authentication devices for security documents that are difficult to counterfeit, yet relatively inexpensive to manufacture, and are suitable for application to a range of substrate materials including both paper and polymer films.

SUMMARY

It is an object of the invention, at least in selected embodiments, to provide an authentication device adapted for use with a security document to provide optical based security authentication.

Certain exemplary embodiments provide an authentication device attachable to a security document having a substrate, the authentication device comprising: a piezoelectric material layer for generating an electric field in response to mechanical stress; and an optically responsive layer directly attached to the piezoelectric material layer, the attached layers being absent a direct electrical connection, the optically responsive layer being operable between a first state and a second state having different ocular perceptions; wherein the optically responsive layer changes from the first state to the second state in response the electric field generated by the piezoelectric material layer.

Certain exemplary embodiments can also provide an authentication device attachable to a substrate of a security document, the authentication device comprising: a first conductive material layer applied to the substrate; a piezoelectric material layer applied directly to the conductive material layer; an optically responsive layer applied over the piezoelectric layer covering all surfaces and in contact the first conductive layer; and a second conductive material layer applied over the optically responsive layer and in contact the first conductive material layer.

BRIEF DESCRIPTION OF THE DRAWINGS

FIG. 2A illustrates a top view of a security document incorporating an authentication device according to an embodiment;

FIGS. 2B(1) and 2B(2) illustrate cross-sectional views (taken along line A-A') of two layering arrangements of the authentication device of FIG. 2A;

FIG. 2C illustrates a plan view of the security document of FIG. 2A in response to an applied electric field;

FIG. 3D illustrates a top view of a security document according to another embodiment;

DETAILED DESCRIPTION

The described authentication devices according to various embodiments use an optically responsive layer (ORL). In a most general form, an optically responsive layer (or simply termed an active layer) is a reflective display that can use electrophoresis to switch pixels or segments on and off. Electrophoresis is the motion of charge particles suspended in a liquid in response to an applied electric field. An example of an optically responsive layer is discussed in conjunction with FIG. 1.

Figure 1:
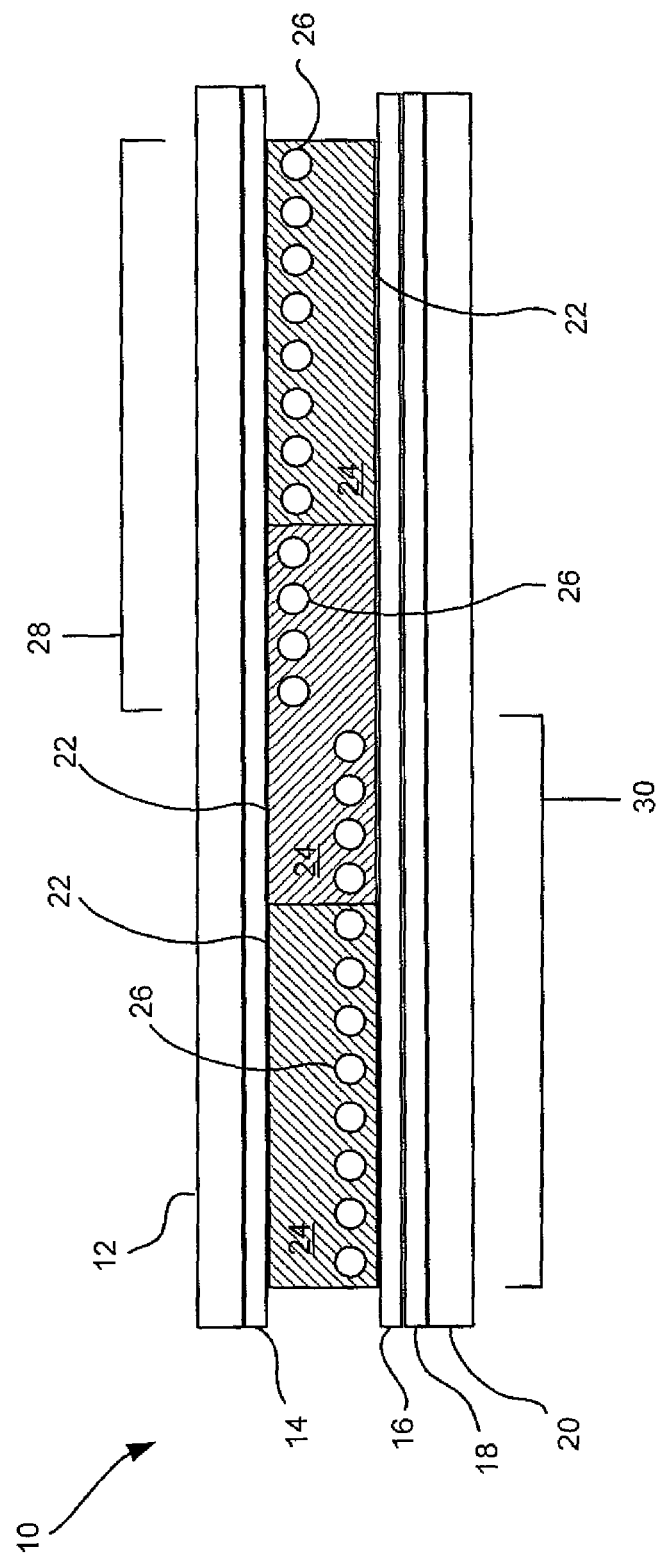
FIG. 1 illustrates a sample structure of an optically responsive layer suitable for use with the described embodiments.

FIG. 1 illustrates a cross-sectional view of a typical optically responsive layer 10 (e.g., electronic paper/e-paper, such as SiPix Microcup® Electronic Paper). The ORL 10 includes a plastic top layer 12, a transparent conductor layer 14, a sealing layer 16, an adhesive layer 18 and a patterned conductor 20. A series of compartments 22 are arranged between the layer 14 and the layer 16 to hold a dielectric fluid 24, which contains charged particles 26 or particles covered with a coating that can develop a charge in the presence of an electric field. In response to an applied electric field, the charged particles 26 migrate through the dielectric fluid 24. When the charged particles 26 are at the top of the compartments 22 in a region 28 they become visible (by reflecting a white color). When the charged particles 26 remain at the bottom of the compartments 22 in a region 30 they will reflect an alternative color (such as black, red, green blue, etc.) Grayscale effects can also be produced by modulating the applied electric field across the ORL 10.

FIG. 2A illustrates a top view of a security document 40, and FIGS. 2B(1) and 2B(2) show cross-sections through the security document 40 along line A-A' according to two layering arrangements. The security document 40 includes a substrate 42 for receiving and retaining an authentication device 44. The substrate 42 may comprise any suitable material or combination of materials based on type of application. For banknotes the substrate can be a polymer such as PET having a thickness of about 12 μm.

The FIG. 2B(1) layering arrangement of the authentication device 44 includes a piezoelectric layer 46, which is attached to the substrate 42, and an optically responsive layer (ORL) 48 that is directly attached to the surface of the piezoelectric layer 46. In a case where the substrate 42 includes a transparent window portion 50, the FIG. 2B(2) arrangement of the authentication device 44 can be used where the layers 46 and 48 are switched such that the ORL 48 is attached to the substrate 42 and the piezoelectric layer 46 is attached to the ORL 48. In these two layering arrangements, the piezoelectric layer 46 is capable of generating the required electric field to cause a change in state in the ORL 48 as described in more detail below.

FIG. 2A shows the authentication device 44 in a first (off) state such that it has a generally white or colorless appearance. In response to an applied mechanical stress (bending, twisting) to the authentication device 44 (in particular to the piezoelectric layer 46) the authentication device 44 transitions to a second (on) state, shown in FIG. 2C, to reveal an authentication image/message [$ $ $]. In the FIG. 2B(1) layering arrangement of the authentication device 44 the image [$ $ $] can be seen from the top of the security document 40 and in the FIG. 2B(2) layering arrangement of the authentication device 44 the image [$ $ $] can be seen from the back of the security document 40 through the transparent window portion 50. The authentication image is previously established in the internal structure (i.e., as an embossed microstructure) of the ORL 48.

The authentication image can include any combination of text, symbols, icons and the like. In particular, the charges generated in the piezoelectric layer 46 (due to the applied mechanical stress) generate electric field lines that spread out from a point charge in search of the opposite charge. The strength of the electric field experienced within the ORL 48 is based on the proximity of the origination point or in a plane where the field lines find a source of the opposite charge. The closer that the point of opposite charge can be found to the ORL 48 the stronger the electric field will be within the ORL 48. Referring to FIG. 1, the charged particles 26 respond to the applied electric field 50 by moving within the compartments 22 to change the apparent reflectivity of the compartments 22, giving rise to the change in appearance of the ORL 48.

Figure 2D:
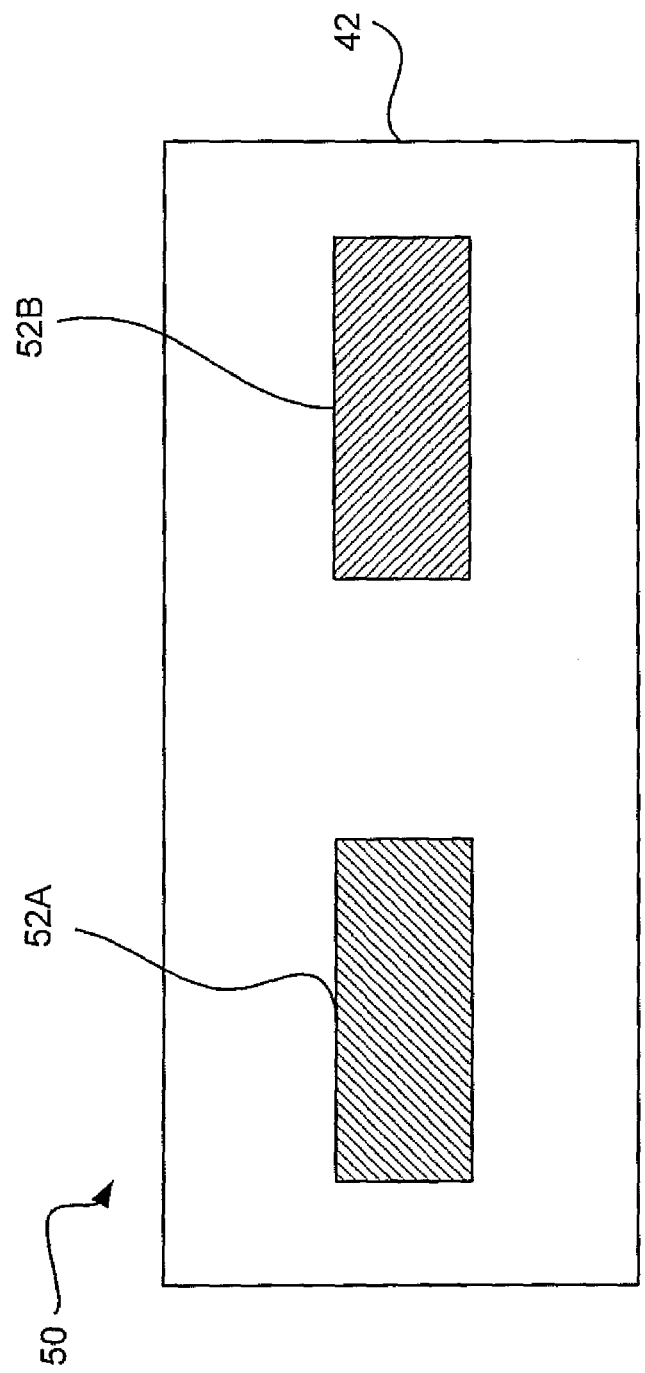
FIG. 2D illustrates a top view of a security document according to another embodiment.

When a SiPix type structure is used as the ORL 10, an embossed microstructure that reflects the authentication image can have a number of possible shapes (e.g., hexagonal pattern, numerical shapes matching the denomination of the bank note, etc.). FIG. 2D illustrates an alternate security document 50 that can be used to verify authenticity without relying on electrical activation of the particles 26 of the ORL 10. In particular, the security document 50 includes the piezoelectric layer 46 and two separated transparent window regions 52A and 52B each with a unique ORL 10 embossed microstructure. By folding the security document 50 such that the two regions 52A and 52B are aligned over each other then when viewed by holding the overlapping regions 52A,B up to a light source a viewer would note the generation of a Moire pattern (an interference pattern produced by overlaying similar but slightly offset patterns) to reveal an authentication image. Authentication using this arrangement does not require special equipment (such as external activation devices, magnification aids, etc.) and can be used when electrical activation of the particles 26 of the ORL 10 is not possible (e.g., due to extreme damage).

Figure 3A:
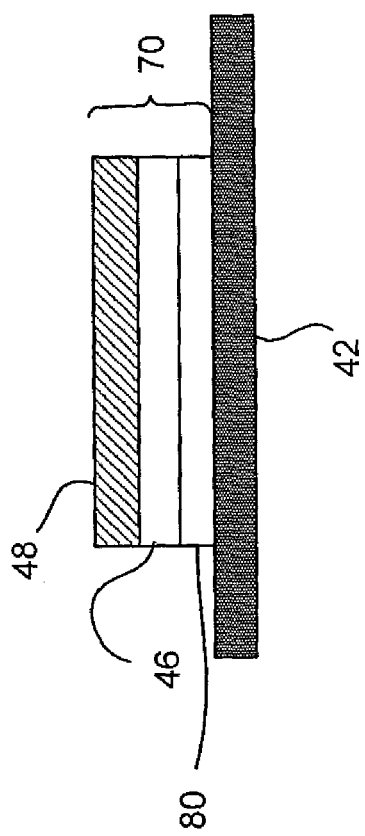
FIGS. 3A, 3B and 3C illustrate cross-sectional views of authentication devices incorporating a conductive layer according to further embodiments.
Figure 3B:
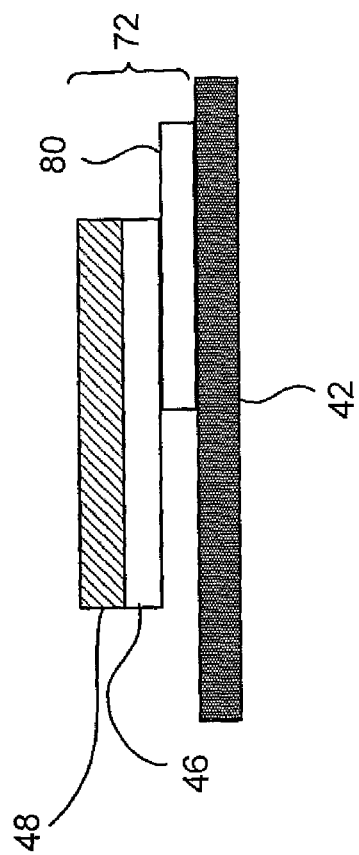
Figure 3C:
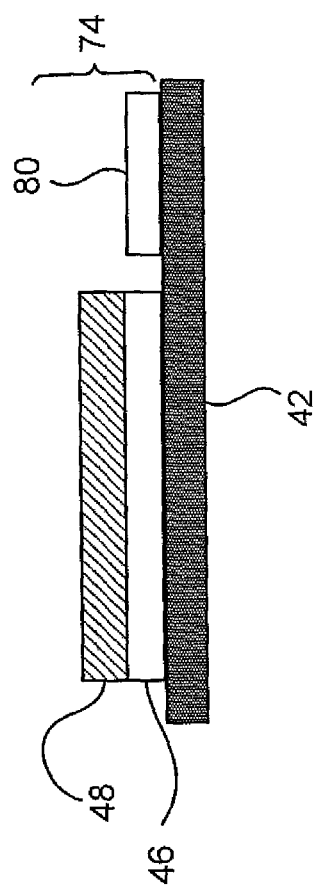

FIGS. 3A, 3C and 3C illustrate cross-sectional views of authentication devices 70, 72 and 74, respectively, incorporating a conductive material layer 80 according to further embodiments. The conductive material layer 80 is used to concentrate the electric field generated by the piezoelectric layer 46. The authentication devices 70, 72 and 74 are mountable to the substrate 42 of the security document 40 shown in FIG. 2A.

Three implementation examples are illustrated: FIG. 3A shows all three layers (80, 46 and 48) being aligned and stacked together; FIG. 3B shows the conductive material layer 80 being offset but in contact with piezoelectric layer 46; and FIG. 3C shows conductive material layer 80 being separate from but in close proximity to the piezoelectric layer 46.

The state change of the ORL 48 for devices 70, 72 and 74 occurs through the same mechanical stressing (flexing/bending) approach described above or, alternatively, from an electric field effect generated by a human finger brought into close proximity to the ORL 48. The human finger acts as a source of opposite charge or as a termination point (for the generated electric field), which effectively increases the strength of the electric field experienced by the ORL 48.

The conductive material layer 80 (particularly in embodiments 70 and 72) can be transparent by using PEDOT:PSS (or polyethylene dioxythiophene polystyrene sulfonate) such as that sold under trademark Clevios™, or conductive polymers based on polypyrrole and polyaniline and carbon nanotubes.

An alternative authentication device 76 is shown in top view in FIG. 3D. The device 76 includes the ORL 48 and the piezoelectric layer 46 and adds a plurality of narrowly spaced conducting filaments 82 applied to the top of the ORL 48. No separate conductive layer 80 is used in device 76. The conducting filaments 80 act as both an electric field termination point and to concentrate the electric field generated by the piezoelectric layer 46, which is layered under the ORL 48. The conducting filaments 82 can be arranged (through selected spacing and dimension) to act as an optical polarizer for the authentication image.

An action as simple as minor flexing or bending of the security document 40 in a region of the authentication devices 70, 72, 74, 76 will in itself be sufficient to give rise to an appearance change (see [$ $ $] image in FIG. 2C) indicative of a legitimate bank note (or in the absence of any appearance change, one may assume the bank note is counterfeit). Alternatively, the authentication image [$ $ $] can be patterned directly in a transparent conductive layer (such as in embodiments 70 and 72). This arrangement establishes a spatial pattern of the electric field established across the ORL 48. in particular, the authentication image of the ORL 48 is controlled by shape/pattern established in the conductive material layer.

Figure 4:
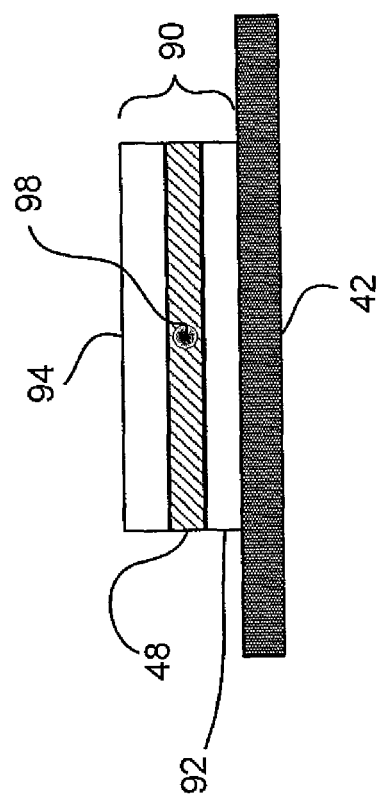
FIG. 4 illustrates a cross-sectional view of an authentication device incorporating two piezoelectric material layers according to a further embodiment.

FIG. 4 illustrates a cross-sectional view of an authentication device 90 incorporating two piezoelectric layers 92 and 94 layered on both sides of the ORL 48. The authentication device 90 is mountable to the substrate 42 of the security document 40 shown in FIG. 2A.

The piezoelectric layers 92 and 94 are not directly electrically connected to the ORL 48. In particular, the layers 92, 48 and 94 are contact attached using commonly known bonding techniques. The use of two piezoelectric layers 92 and 94 enables the ORL 48 to undergo the previously described state changes (on<->off) as well as provide for a stronger or more complex applied electric field to the ORL 48 since manipulation of the authentication device 90 will generate charges of opposite polarity on each side of the ORL 48. With reference to FIG. 1, this polarity difference can influence the charged particles 26 in the compartments 22 to exhibit a more complex visual pattern, such as the introduction of additional geometric shapes surrounding the authentication image [S $ $].

Examples of two orientation arrangements or stack sequences that are possible for the authentication device 90 when PVDF (polyvinylidene fluoride) is used as the piezoelectric layer 92 and 94 material are:
  (a) Layer 92 (hydrogen side of PVDF—fluorinated side)—ORL 48—layer 94 (hydrogen terminating side of PVDF—fluorinated side of PVDF); or
  (b) Layer 92 (hydrogen terminating side of PVDF—fluorinated side)—ORL 48—layer 94 (fluorinated side—hydrogen terminating side of PVDF).

Arrangement (a) is used when the center of a bend radius lies in a center point 98 of the ORL 48 in order to produce opposite polarity charges on each side of the ORL 48. Arrangement (b) is used when the center of a bend radius lies outside of the ORL 48 (such as on the substrate 42) in order to produce opposite charges on each side of the ORL 98.

The choice of arrangement (a) or (b) will depend on the thickness of the layers 92, 48, and 94 and mechanical properties of the substrate 42 that the authentication device 90 is attached to. Further discussion of PVDF and derivatives is provided below.

Figure 5:
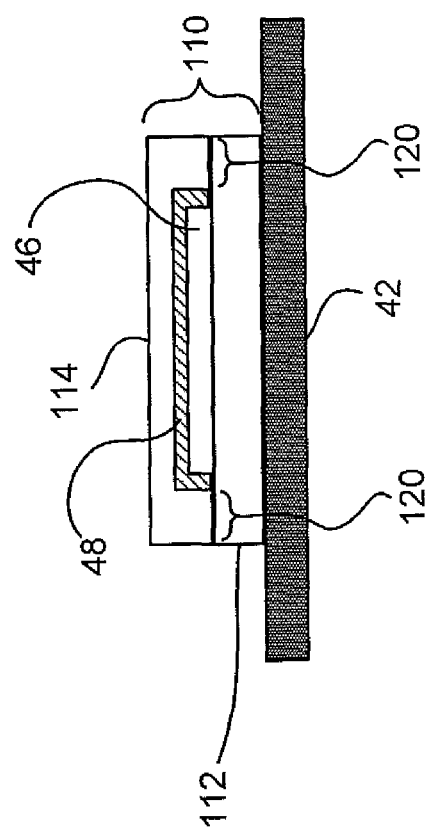
FIG. 5 illustrates a cross-sectional view of an authentication device according a further embodiment.

FIG. 5 illustrates a cross-sectional view of an authentication device 110 incorporating two conductive layers 112 and 114 layered on either side of the piezoelectric layer 46 and ORL 48 pair. The authentication device 110 is mountable to the substrate 42 of the security document 40 shown in FIG. 2A.

In particular, the first conductive layer 112 is applied to the substrate 42 and the piezoelectric layer 46 is applied directly on top of layer 112 with an exposed border region 120. Next, the ORL 48 is applied over the piezoelectric layer 46 completely covering the top surface and both edges. Finally, the second conductive layer 114 is applied over layers 46 and 48 covering the ORL 48 and extending to make contact with the first conductive layer 112 in the border region 120. The two conductive layers 112 and 114 act to intensify the electric field generated by the piezoelectric layer 46 by ensuring the top surface of the ORL 48 is at the same potential as the bottom surface of the piezoelectric layer 46. At least one of the two conductive layers 112, 114 is transparent or semi-transparent.

If the second conductive layer 114 is transparent/semi-transparent then the authentication image [$ $ $] is viewable from the top of the security document 40. If the first conductive layer 112 is transparent/semi-transparent and the second conductive layer 114 is not transparent/semi-transparent then the authentication image [$ $ $] will be viewable in the transparent window region 50 of the substrate 42 (as discussed in relation to FIG. 2B(2)). The authentication device 110 is durable and can survive a loss of connection of the (top) second conductive layer 114 to the (bottom) first conductive layer 112. Only a small portion of the second conductive layer 114 needs to remain intact to act as a source of opposite charge for the field lines emanating from the charges generated on the top surface of the piezoelectric layer 46 (i.e., the surface in contact with the bottom surface of the ORL 48).

The described embodiments of FIGS. 2 to 5 provide electrically active authentication devices for use with security documents that are capable of functioning after repeated crumple tests and in actual bank note circulation conditions. The described embodiments eliminate traditional high conductivity electrodes and complete electrical circuits. Since traditional electrodes are not used to transport electrical charge from a piezoelectric material layer power source to an active layer it is not possible to disable the security feature through electrode breakage. The charges generated in the piezoelectric material layer form an electric field that spread out from a point charge in search of an opposite charge. The strength of the electric field experienced within the active layer is dependent on the proximity of the point, or a plane where the field lines find a source of opposite charge. The closer that the point of opposite charge can be found in the active layer the stronger the electric field will be within the active layer.

The various layers (piezoelectric, conductive, and optically responsive) described above can be bonded together and to the substrate in many ways. For example, for polymer substrates it may be preferred to attach the authentication devices via an adhesive layer. Suitable adhesive materials may be selected from but are not limited to: acrylated urethanes, methacrylate esters, mercapto-esters and UV curable adhesives.

The described piezoelectric layers refer to any layer formed from any material that: (1) can be change shape, thickness, configuration or form, either permanently or temporarily, under conditions of an electrical potential difference or an increased electrical potential difference by virtue of the piezoelectric properties of the materials of the layer. Piezoelectric layer also refers to any layer that exhibits and altered charge distribution or charge properties upon application to the material of the layer mechanical stress or pressure. For example, the thickness of the layer may be changeable between a first state absent electrical potential difference, (or under less electrical potential difference) and a second state under increased electrical potential difference, and (2) has suitable optical properties such that when the layer separates a reflector layer and an absorber layer as described herein an optical interference structure is formed in at least one of the said first and second states.

As described in FIG. 4, the piezoelectric layers can be reversibly changeable such that the layer can be transitioned between first and second states multiple times upon repeated application and removal of the electrical potential difference, or repeated increase and decrease of electrical potential difference. The degree shape or thickness change of the piezoelectric layer (for example the capacity of the layer to be reduced or increased in thickness upon application or increase of electrical potential difference) may be established according to the material used to form the layer. For example, different polymers or crystals may be less or more inclined to change shape or thickness compared to other materials under the same degree of electrical potential difference. Examples of materials suitable for use in the formation of piezoelectric layers include but are not limited to ferroelectric and pyroelectric materials such as poly(vinylidene fluoride) (PVDF) and its copolymer with trifluoroethylene P(VDFTrFE) (reference High electrostrictive). The piezoelectric layers can also be made of materials in polyvinylidene difluoride (PVDF) or PVDF derivatives. In one example, the piezoelectric layers are made of poly (vinylidene fluoride-trifluoroethylene) (P(VDF-TrFE)) or poly(vinylidene fluoride/tetrafluoroetbylene) (P(VDF-TeFE)). In another example, the piezoelectric layers are made of a blend of a material in PVDF or PVDF derivatives and at least one of lead zirconate titanate (PZT) fibers or particles, polymethylmethacrylate (PMMA), or polyvinyl chloride) (PVC).

The reference to a security document in the above embodiments refers to any document, item or article of manufacture of any importance or value, which might be subject to counterfeit copying. In selected embodiments, a security document may include features or devices intended to show that the document, item or article is a genuine and legitimate version, and not a counterfeit copy of such a document, item or article. For example, such security documents may include security features such as those disclosed herein. Such security documents may include, but are not limited to, identification documents such as passports, citizenship or residency documents, drivers' licenses, bank notes, cheques, credit cards, bank cards, and other documents, as well as labeling or other security features, for items of monetary value such as designer clothing, accessories, or any other branded products where it is desired to indicate or demonstrate the authenticity or legitimacy of the product compared to a counterfeit copy. Such security features may be permanently or removably incorporated therein depending upon the nature of the document, item or article, and the intended end user.

The invention claimed is:

1. An authentication device attachable to a security document having a substrate, the authentication device comprising:
    a piezoelectric material layer for generating an electric charge in response to mechanical stress; and
    an optically responsive layer directly attached to the piezoelectric material layer, the optically responsive layer being operable between a first state and a second state having different ocular perceptions when subjected to an electric field generated by the electrical charge from the piezoelectric material layer, wherein the optically responsive layer and the piezoelectric material layer operate as an open circuit when transitioning from the first state to the second state.

2. The authentication device of claim 1, wherein the second state includes an authentication image.

3. The authentication device of claim 1, wherein a layering arrangement is:
    the substrate, the piezoelectric material layer and the optically responsive layer.

4. The authentication device of claim 1, wherein a layering arrangement is:
    the substrate, the optically responsive layer and the piezoelectric material layer and wherein the substrate includes a transparent portion to expose a portion of the optically responsive layer.

5. The authentication device of claim 3, further comprising a conductive material layer attached between the substrate and the piezoelectric material layer.

6. The authentication device of claim 5, wherein the conductive material layer is transparent.

7. The authentication device of claim 6, wherein an authentication image is established in the transparent conductive material layer for establishing a spatial pattern across the optically responsive layer in response to the electric field.

8. The authentication device of claim 5, wherein the conductive material layer is offset relative to the piezoelectric material layer.

9. The authentication device of claim 3, further comprising a conductive material layer attached to the substrate and being separate from and proximate to the piezoelectric material layer.

10. The authentication device of claim 3, further comprising a plurality of spaced conductive filaments arranged on top of the optically responsive layer.

11. An authentication device comprising two spaced authentication devices of claim 3 arranged in transparent windows such that overlapping the two spaced authentication device reveals an authentication image without electrical activation of the optically responsive layer.

12. The authentication device of claim 1, further comprising an additional piezoelectric layer to form a layering arrangement defined as:
    the substrate, the piezoelectric material layer, the optically responsive layer and the additional piezoelectric layer.

13. An authentication device attachable to a substrate of a security document, the authentication device comprising:
    a piezoelectric material layer for generating an electrical charge in response to mechanical stress;
    an optically responsive layer being operable between a first state and a second state having different ocular perceptions when subjected to an electric field generated by the electrical charge from the piezoelectric material layer, and
    a conductive layer connecting one side of the piezoelectric material layer to the optically responsive layer such that a side of the piezoelectric layer opposite the conductive layer is in direst contact to one side of the optically responsive layer, wherein the optically responsive layer, the piezoelectric material layer and the conductive layer operating as an open circuit when transitioning from the first state to the second state.

14. The authentication device of claim 13, wherein the conductive material layer includes a semi-transparent or transparent region.

* * * * *

UNITED STATES PATENT AND TRADEMARK OFFICE
CERTIFICATE OF CORRECTION

PATENT NO. : 9,082,054 B2  Page 1 of 1
APPLICATION NO. : 14/345781
DATED : July 14, 2015
INVENTOR(S) : MacPherson et al.

It is certified that error appears in the above-identified patent and that said Letters Patent is hereby corrected as shown below:

In the claims,

Column 8, Claim 13, Line 41, please replace "layer," with --layer;--

Column 8, Claim 13, Line 45, please replace "direst" with --direct--

Signed and Sealed this
Seventeenth Day of May, 2016

Michelle K. Lee
*Director of the United States Patent and Trademark Office*